United States Patent
Alqahtani et al.

(10) Patent No.: US 12,473,481 B1
(45) Date of Patent: Nov. 18, 2025

(54) METAL OXIDE NANOSHALE INHIBITORS FOR WATER-BASED DRILLING FLUIDS

(71) Applicant: SAUDI ARABIAN OIL COMPANY, Dhahran (SA)

(72) Inventors: Hassan Sakar Alqahtani, Dhahran (SA); Mohammed Khaled Al-Arfaj, Dhahran (SA); Ali Hussain Alghiryafi, Dhahran (SA); Mohammed Abdullah Alotaibi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/664,209

(22) Filed: May 14, 2024

(51) Int. Cl.
| | | |
|---|---|---|
| E21B 43/16 | (2006.01) | |
| C09K 8/06 | (2006.01) | |
| C09K 8/58 | (2006.01) | |

(52) U.S. Cl.
CPC .............. C09K 8/06 (2013.01); C09K 8/58 (2013.01); E21B 43/16 (2013.01); *C09K 2208/10* (2013.01); *C09K 2208/12* (2013.01)

(58) Field of Classification Search
CPC ................................. C09K 8/06; E21B 43/16
USPC ......................................................... 166/305.1
See application file for complete search history.

(56) References Cited

U.S. PATENT DOCUMENTS

| | | | | |
|---|---|---|---|---|
| 8,075,799 | B2 * | 12/2011 | Hong ........................ | C09K 5/10 252/73 |
| 8,278,251 | B2 * | 10/2012 | Huang ...................... | C09K 8/58 166/266 |
| 2013/0281326 | A1 * | 10/2013 | Merli ........................ | C09K 8/06 507/129 |
| 2017/0218250 | A1 * | 8/2017 | Boul ........................ | C09K 8/506 |
| 2020/0332638 | A1 * | 10/2020 | Santra ...................... | C09K 8/64 |

OTHER PUBLICATIONS

Abdo et al., "Nano-Enhanced Drilling Fluids: Pioneering Approach to Overcome Uncompromising Drilling Problems," J. Energy Resour. Technol. 134 (1): 014501, 2012, https://doi.org/10.1115/1.4005244, 7 pages.

Aftab et al., "Enhancing the Rheological Properties and Shale Inhibition Behavior of Water-Based Mud Using Nanosilica, Multi-Walled Carbon Nanotube, and Graphene Nanoplatelet," Egypt J Petrol 26 (2): 291-299, 2017, https://doi.org/10.1016/j.ejpe.2016.05.004.

Agarwal et al., "Flow Behavior of Nanoparticle Stabilized Drilling Fluids and Effect of High-Temperature Aging," Paper presented at the 2011 American Association of Drilling Engineers National Technical Conference and Exhibition, Houston, Texas, USA, Apr. 12-14. AADE-11-NTCE-3, 6 pages.

Anoop et al., "Rheology of Mineral Oil-SiO2 Nanofluids at High Pressure and High Temperatures," Int J Therm Sci 77 (2014): 108-115. https://doi.org/10.1016/j.ijthermalsci.2013.10.016.

Cai et al., "Decreasing Water Invasion into Atoka Shale Using Nonmodified Silica Nanoparticles," SPE Drill & Compl 27 (1): 103-112. Mar. 2012. SPE-146979-PA. https://doi.org/10.2118/146979-PA.

Chalmers et al., "Characterization of gas shale pore systems by porosimetry, pycnometry, surface area, and field emission scanning electron microscopy/transmission electron microscopy image analyses: Examples from the Barnett, Woodford, Haynesville, Marcellus, and Doig units," University of British Columbia, Vancouver, Canada, 2012, 21 pages.

Chenevert, "Shale Control with Balanced-Activity Oil-Continuous Muds," Journal of Petroleum Technology, Oct. 1970, 8 pages.

Fakoya et al., "Enhancement of Filtration Properties in Surfactant-Based and Polymeric Fluids by Nanoparticles," Paper presented at the SPE Eastern Regional Meeting, Charleston, West Virginia, USA, Oct. 21-23, 2014. SPE-171029-MS. https://doi.org/10.2118/171029-MS, 12 pages.

Ghanbari et al., "A Facile Method for Synthesis and Dispersion of Silica Nanoparticles in Water-Based Drilling Fluid," Colloid Polym Sci 294 (2): 381-388. 2016, https://doi.org/10.1007/s00396-015-3794-2.

Hassani et al., "The Effect of Nanoparticles on the Heat Transfer Properties of Drilling Fluids," J Pet Sci Eng 146 (Oct. 2016): 183-190. https://doi.org/10.1016/j.petrol.2016.04.009.

Hoelscher et al., "Application of Nanotechnology in Drilling Fluids," Paper presented at the SPE International Oilfield Nanotechnology Conference and Exhibition, Noordwijk, The Netherlands, Jun. 12-14, 2012. SPE-157031-MS. https://doi.org/10.2118/157031-MS, 7 pages.

Ismail et al., "The Novel Approach for the Enhancement of Rheological Properties of Water-Based Drilling Fluids by Using Multi-Walled Carbon Nanotube, Nanosilica and Glass Beads," J Pet Sci Eng 139 (Mar. 2016): 264-275. https://doi.org/10.1016/j.petrol.2016.01.036.

Ji et al., "Laboratory Evaluation and Analysis of Physical Shale Inhibition of an Innovative Water-Based Drilling Fluid with Nanoparticles for Drilling Unconventional Shales" Paper presented at the SPE Asia Pacific Oil and Gas Conference and Exhibition, Perth, Australia, Oct. 22-24, 2012. SPE-158895-MS. https://doi.org/10.2118/158895-MS, 12 pages.

Louks et al.,"Mississippian Barnett Shale: Lithofacies and depositional setting of a deep-water shale-gas succession in the Fort Worth Basin, Texas," The American Association of Petroleum Geologists, 2006, 23 pages.

Mahmoud et al., "Nanoparticle-Based Drilling Fluids for Minimizing Formation Damage in HP/HT Applications," Paper presented at the SPE International Conference and Exhibition on Formation Damage Control, Lafayette, Louisiana, USA, Feb. 24-26, 2016. SPE-178949-MS. https://doi.org/10.2118/178949-MS, 26 pages.

(Continued)

*Primary Examiner* — William D Hutton, Jr.
*Assistant Examiner* — Ashish K Varma
(74) *Attorney, Agent, or Firm* — Vorys, Sater, Seymour and Pease, LLP

(57) ABSTRACT

Treatment fluids may be used in hydrocarbon extraction operations. Example methods of use of treatment fluids including nanoparticles may include: introducing a treatment fluid into a subterranean formation including a clay, the treatment fluid including a plurality of metal oxide nanoparticles dispersed in an aqueous fluid; and interacting the metal oxide nanoparticles with the clay in the subterranean formation to at least partially inhibit entry of the clay into the treatment fluid.

16 Claims, No Drawings

(56) References Cited

OTHER PUBLICATIONS

Mooney et al., "Adsorption of Water Vapor by Montmorillonite. II. Effect of Exchangeable Ions and Lattice Swelling as Measured by X-Ray Diffraction," Journal of the American Chemical Society (1952), 1370-1374.

Norrish, "The swelling of montmorillonite," Discussions of the Faraday Society, (1954), 120-134.

Riley et al., "Wellbore Stability in Unconventional Shales—The Design of a Nano-Particle Fluid," Paper presented at the SPE Oil and Gas India Conference and Exhibition, Mumbai, India, Mar. 28-30, 2012. SPE-153729-MS. https://doi.org/10.2118/153729-MS, 8 pages.

Sensoy et al., "Minimizing Water Invasion in Shale Using Nanoparticles," Paper presented at the SPE Annual Technical Conference and Exhibition, New Orleans, Louisiana, USA, Oct. 4-7, 2009. SPE-124429-MS. https://doi.org/10.2118/124429-MS, 16 pages.

Sharma et al., "A New Family of Nanoparticle-Based Drilling Fluids," Paper presented at the SPE Annual Technical Conference and Exhibition, San Antonio, Texas, USA, Oct. 8-10, 2012. SPE-160045-MS. https://doi.org/10.2118/160045-MS, 13 pages.

Shen et al., "Quantitative XRD Bulk and Clay Mineralogical Determination of Paleosol Sections of Unayzah and Basal Khuff Clastics in Saudi Arabia," Powder Diffraction 27 (2), Jun. 2012, 5 pages.

Smith et al., "Composition and Depositional Environment of Major Easter Canadian Oil Shales," International Journal of Coal Geology, vol. 19, Issues 1-4, Dec. 1991, pp. 385-438.

Tour, "Analysis of Rocks Using X-Ray Fluorescence Spectrometry," The Rigaku Journal, vol. 6, 1989, 9 pages.

Lopez et al., "Use of Nanoparticles in Completion Fluids as Dual Effect Treatments for Well Stimulation and Clay Swelling Damage Inhibition: An Assessment of the Effect of Nanoparticle Chemical Nature," Nanomaterials 2023, 13 (3), 388; https://doi.org/10.3390/nano13030388, 23 pages.

Saleh et al., "Advances in functionalized Nanoparticles based drilling inhibitors for oil production," Energy Reports, vol. 5, Nov. 2019, pp. 1293-1304.

Bayat et al., "Appraising the impacts of $SiO_2$, ZnO and $TiO_2$ nanoparticles on rheological properties and shale inhibition of water-based drilling muds," Colloids and Surfaces A: Physicochemical and Engineering Aspects, vol. 581, Nov. 20, 2019, 123792, 10 pages.

Ejileugha et al., "Metal oxide nanoparticles in oil drilling: Aquatic toxicological concerns," Journal of Hazardous Materials Advances, vol. 7, Aug. 2022, 100116, 17 pages.

Parizad et al., "$SiO_2$ nanoparticle and KCl salt effects on filtration and thixotropical behavior of polymeric water based drilling fluid: With zeta potential and size analysis," Results in Physics, vol. 9, Jun. 2018, pp. 1656-1665.

Ahmed et al., "Experimental analysis of drilling fluid prepared by mixing iron (III) oxide nanoparticles with a KCl-Glycol-PHPA polymer-based mud used in drilling operation," Exploration Engineering, Jun. 25, 2020, vol. 10, pp. 3389-3397.

Zhang, "Review of Synthesis and Evaluation of Inhibitor Nanomaterials for Oilfield Mineral Scale Control," Front. Chem., Nov. 18, 2020, Sec. Nanoscience, vol. 8—2020, 20 pages.

Keller et al., "3D geometry and topology of pore pathways in Opalinus clay: Implications for mass transport," Applied Clay Science, vol. 52, Issues 1-2, Apr. 2011, pp. 85-95.

* cited by examiner

16
METAL OXIDE NANOSHALE INHIBITORS FOR WATER-BASED DRILLING FLUIDS

FIELD OF THE DISCLOSURE

The present disclosure relates generally to enhanced hydrocarbon recovery.

BACKGROUND OF THE DISCLOSURE

Subterranean formations including shale formations, requiring enhanced hydrocarbon recovery methods. Such methods may include drilling operations whereby shale wells are drilled and completed within a shale formation.

Wellbore stability (or lack thereof) is a critical consideration when drilling and operating a well in a shale formation or any formation including clay minerals. Clay minerals may generally include: kaolinite, smectite, illite, chlorite and vermiculite. When clay particles come in contact with aqueous drilling fluids, the clay minerals may begin to swell, disperse, or slouch. Such reactions may lead to subsequent issues during drilling or operation of a formation, leading to instability. The reaction of the formation may depend on the type of mineral therein. For example, a shale formation with a high percentage of smectite may swell during drilling and operations, while a shale with a high percentage of kaolinite may disintegrate and disperse.

Various treatment fluids may be used in shale drilling operations for providing lubrication and stabilization during drilling operations, such as, for example, treatment fluids including mud systems. Oil-based mud systems (OBMs) may generally be regarded to provide shale stability, high penetration rates, and sufficient lubricity; however, such fluids may have significant deleterious environmental effects and may have high fluid material costs. Water-based mud systems (WBMs) are an alternative; however, present WBMs generally provide limited shale stability.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

Nonlimiting example methods of the present disclosure may include: introducing a treatment fluid into a subterranean formation comprising a clay, the treatment fluid comprising a plurality of metal oxide nanoparticles dispersed in an aqueous fluid; and interacting the metal oxide nanoparticles with the clay in the subterranean formation to at least partially inhibit entry of the clay into the treatment fluid.

Nonlimiting example methods of the present disclosure may include: introducing a treatment fluid into a subterranean formation comprising a clay, the treatment fluid comprising a plurality of metal oxide nanoparticles dispersed in an aqueous fluid, wherein the metal oxide nanoparticles comprise zinc oxide, manganese oxide, silicon dioxide, or any combination thereof; and interacting the metal oxide nanoparticles with the clay in the subterranean formation to at least partially inhibit entry of the clay into the treatment fluid, wherein the metal oxide nanoparticles have a zeta potential of about 25 mV or greater or about −15 mV or less.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

Not applicable.

DETAILED DESCRIPTION

Embodiments in accordance with the present disclosure generally relate to hydrocarbon recovery.

The present disclosure may include compositions and methods concerning the use of treatment fluids for enhanced hydrocarbon recovery operations. Specifically, the present disclosure may provide for treatment fluids (e.g., drilling fluids) for clay inhibition methods including shale inhibition.

Furthermore, treatment fluids of the present disclosure may reduce or eliminate the use of alkali metal salts (e.g., potassium chloride) for inhibition of clay entry (e.g., shale entry) into the fluid. Conventional treatment fluids may utilize alkali metal salts for preventing clay entry into the fluid (e.g., a drilling fluid); however, alkali metal salts may be generally toxic and may have significant management costs associated therewith. Thus, reduction or elimination of alkali metal salts may increase productivity of an operation and/or decrease costs associated therewith.

"Clay" as used herein refers to additional minerals within a subterranean formation that may lead to undesired side reactions or precipitations, thus affecting the operation in question. Clays may generally comprise a minority of minerals within a subterranean formation, as measured by mass. Examples of clays may include, but are not limited to, smectite, illite, kaolinite, chlorite, the like, or any combination thereof.

Treatment fluids of the present disclosure may include metal oxide nanoparticles. Metal oxides of relevance in the present disclosure may include any suitable metal oxide nanoparticle compounds. Examples of suitable metal oxides may include, but are not limited to, zinc oxide (ZnO), manganese oxide (MnO), silicon dioxide ($SiO_2$), the like, or any combination thereof. Metal oxide nanoparticles of the present disclosure may have an average particle size of about 10 nm to about 500 nm, or about 20 nm to about 300 nm, or about 20 nm to about 200 nm, or about 30 nm to about 150 nm, or about 50 nm to 150 nm. It should be noted that various groups of metal oxide nanoparticles may have varying average particle size depending on the composition of the metal oxide nanoparticles. ZnO nanoparticles, if present in treatment fluids of the present disclosure, may preferably have an average particle size of about 80 nm to about 250 nm, or even more preferably about 90 nm to about 200 nm, or about 100 nm to about 180 nm. MnO nanoparticles, if present in treatment fluids of the present disclosure, may preferably have an average particle size of about 20 nm to about 80 nm, or even more preferably about 30 nm to about 60 nm. $SiO_2$ nanoparticles, if present in treatment fluids of the present disclosure, may preferably have an average particle size of about 50 nm to about 100 nm, or even more preferably about 70 nm to about 90 nm.

"Average particle size" as used herein may be defined as the average width, length, height, diameter, or any combination thereof of a particle (e.g., a nanoparticle). The particles may be of any shape including, but not limited to, spherical, cubic, triangular, oblong, irregular, or any combination thereof.

Metal oxide nanoparticles of the present disclosure may have a zeta potential substantially different from clay (e.g., shale) of a subterranean formation in a given operation. Examples of zeta potentials of metal oxide nanoparticles of the present disclosure may include, but are not limited to, a zeta potential of about −30 mV to about 30 mV, or preferably about 25 mV or greater or about −25 mV or less, or about 25 mV or greater or about −15 mV or less, or about 25 mV to about 100 mV or about −100 mV to about −25 mV, or about 25 mV to about 100 mV or about −100 mV to about −15 mV.

The aforementioned zeta potential ranges may allow for increased colloidal stability of metal oxide nanoparticles within the treatment fluid. Without being bound by theory, particles with a zeta potential of 25 mV or greater or −25 mV or less may be believed to have increased stability due to decreased potential for van der Waals interparticle attractions, as such attractions may conventionally lead to aggregation, coagulation, and/or flocculation of nanoparticles within a fluid.

Metal oxide nanoparticles may be included in treatment fluids of the present disclosure at concentrations including about 0.001% w/v (mass nanoparticles (g) per volume treatment fluid (mL)) to about 2% w/v, or about 0.001% w/v to about 1% w/v, or about 0.001% w/v to about 0.5% w/v, or about 0.01% w/v to about 2% w/v, or about 0.01% w/v to about 1% w/v, or about 0.01% w/v to about 0.25% w/v, or about 0.20% w/v to about 0.25% w/v, or about 0.15% w/v to about 0.30% w/v, or about 0.1% w/v to about 0.5% w/v, or about 0.21% w/v, or 0.001% w/v to 2% w/v, or 0.001% w/v to 1% w/v, or 0.001% w/v to 0.5% w/v, or 0.01% w/v to 2% w/v, or 0.01% w/v to 1% w/v, or 0.01% w/v to 0.25% w/v, or 0.20% w/v to 0.25% w/v, or 0.15% w/v to 0.30% w/v, or 0.1% w/v to 0.5% w/v, or 0.21% w/v.

In some embodiments, treatment fluids of the present disclosure may be substantially free of alkali metal salts. In some embodiments, treatment fluids of the present disclosure may be substantially free of potassium chloride. "Substantially free," as used herein may refer to wherein a concentration (e.g., a concentration of alkali metal salt, or a concentration of potassium chloride) is less than 0.5 wt %, or less than 0.1 wt %, or less than 0.05 wt %, or less than 0.01 wt %, or less than 0.005 wt %, or less than 0.001 wt %, or 0 wt % to 0.5 wt %, or 0 wt % to 0.1 wt %, or 0 wt % to 0.05 wt %, or 0 wt % to 0.01 wt %, or 0 wt % to 0.005 wt %, or 0 wt % to 0.001 wt %.

Treatment fluids of the present disclosure may further include an aqueous fluid at any suitable concentration including, for example, from 0.1 wt % to 99.9 wt %, or 1 wt % to 90 wt %, or 10 wt % to 90 wt %, or 1 wt % to 50 wt %, or 1 wt % to 20 wt %, or 1 wt % to 10 wt %, or 50 wt % to 90 wt %, or 70 wt % to 90 wt %, by total weight of the treatment fluid. Any suitable aqueous fluids may be included in treatment fluids of the present disclosure so long as components of the aqueous fluid are compatible with a given treatment fluid composition (e.g., metal oxide nanoparticles therein) and with a desired hydrocarbon recovery operation. Suitable aqueous fluids for inclusion in the treatment fluids of the present disclosure may include, but are not limited to, fresh water (e.g., stream water, lake water, or municipal treated water), non-potable water such as gray water or industrial process water, sea water, brine, aqueous salt solutions, partially desalinated water, produced water (including brine and other salt water solutions), or any combination thereof.

Furthermore in some embodiments, the treatment fluids described herein may be a colloidal suspension whereby the metal oxide nanoparticles comprise a solid phase suspended within a liquid phase of the treatment fluid. In some embodiments, treatment fluids of the present disclosure may optionally be gelled or emulsified. Gelled treatment fluids may comprise a polymer to promote gelling, wherein the gel may be a composition including, but not limited to, for example, a linear gel, crosslinked polymer gel, the like, or any combination thereof. One of ordinary skill in the art will be able to appropriately select and implement a gelled, emulsified, and/or colloidal form of treatment fluids, given the benefit of the present disclosure.

The treatment fluids described herein may further include one or more additional components suitable for achieving one or more desired functions, provided that the one or more additional components do not adversely affect the function of treatment fluids described herein. Examples of suitable additional components may include, but are not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, an iron control agent, the like, or any combination thereof. Suitable examples of the foregoing will be familiar to one having ordinary skill in the art.

Treatment fluids of the present disclosure may be used in various enhanced hydrocarbon recovery operations as suitable. The term "treatment fluid," and grammatical variants thereof, refers to any fluid that may be used in a treatment operation of a subterranean reservoir (also referred to as "hydrocarbon recovery operation" or simply as "treatment" or "operation" herein) in conjunction with a desired function and/or for a desired purpose. The term "treatment fluid" does not imply any particular action by the fluid or any component thereof. Suitable operations that may be facilitated, aided, promoted, the like, or any combination thereof by a treatment fluid include, but are not limited to, for example, drilling, fracturing, acidizing, flooding, or any combination thereof.

Treatment fluids of the present disclosure may be formulated as a main treatment fluid for introduction to a subterranean formation, or the treatment fluids may be formulated as a pad fluid. As used herein, a "pad fluid" refers to a small-volume treatment fluid that contains at least some of the components present in a main treatment fluid (commonly a larger volume of main treatment fluid) to follow the pad fluid.

In some embodiments, the treatment fluids disclosed herein (including mixing of individual components or mixtures thereof, i.e., within the flowback aid) may be mixed at a remote location from a job site and shipped thereto or, in other embodiments, the treatment fluids may be mixed at a job site. In still other embodiments, the treatment fluid may be mixed and pumped into a subterranean formation on-the-fly. A person having ordinary skill in the art of designing such fluids with the benefit of this disclosure will be able to consider these factors and determine whether remote mixing, on-site mixing, or any other suitable mixing protocol is most appropriate for a given operation. The systems used for handling treatment fluids for use in operations of the present disclosure may include one or more mixing and/or storage tanks used for mixing and/or storing, respectively, treatment fluids prior to use in an operation. Additional tanks may be used for storing spent or partially spent treatment fluid removed from a subterranean formation as part of an operation.

Following an operation, the treatment fluids or a spent or partially spent variant thereof may be produced from the subterranean formation during fluid flowback. Production of the spent or partially spent treatment fluid may take place within 30 minutes, or within about 45 minutes, or within about 60 minutes, or within about 2 hours, or within about 6 hours, or within about 12 hours, or within about 24 hours, depending on the length of time the treatment fluid is shut in downhole to perform the operation.

Systems for introduction of treatment fluids to a wellbore in conjunction with an operation may comprise a pump fluidly coupled to a tubing, the tubing located at least partially within the wellbore and the tubing containing a treatment fluid for a desired operation. The "pump" described herein may comprise a single pump or may comprise one or more pumps which may include "high pressure" and "low pressure" pump(s) in any combination. A "high pressure" pump, i.e., a pump operating at a pressure greater than about 1000 psi, may be used in operations according to the present disclosure where fracturing of the subterranean formation at a pressure higher than the fracture gradient pressure is required. A "low pressure" pump, i.e., a pump operating at a pressure of about 1000 psi or less, may be used in operations where lower pressures are needed and where fracturing of the subterranean formation is not required. Given the benefit of the present disclosure, one having ordinary skill in the art will be able to select an appropriate pump or combination of pumps for a given operation.

The treatment fluids of the present disclosure may be injected using the pump(s) into the subterranean formation using the tubing located within the wellbore. The treatment fluid used in a particular operation may flow downhole through the tubing and flow out of the tubing into the subterranean formation in order to carry out the operation. Subsequently, in some operations, the treatment fluid of a particular operation may be flowed back to the wellhead along with residual components. The treatment fluid and residual components may flow through the tubing or the wellbore annulus and back to the wellhead.

It should be noted that additional nonlimiting components may be present in systems suitable to introduce the treatment fluids to a subterranean formation and to recover fluid from the subterranean formation following an operation. Such additional components will be familiar to one having ordinary skill in the art and include, but are not limited to, supply hoppers, valves, condensers, adapters, joints, gauges, sensors, compressors, pressure controllers, pressure sensors, flow rate controllers, flow rate sensors, temperature sensors, the like, or any combination thereof.

It is also to be recognized that the disclosed treatment fluids may be used in combination with various downhole equipment and tools during an operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices, or components, the like, or any combination thereof.

Additional Embodiments

Embodiments disclosed herein include:

A. A method comprising: introducing a treatment fluid into a subterranean formation comprising a clay, the treatment fluid comprising a plurality of metal oxide nanoparticles dispersed in an aqueous fluid; and interacting the metal oxide nanoparticles with the clay in the subterranean formation to at least partially inhibit entry of the clay into the treatment fluid.

B. A method comprising: introducing a treatment fluid into a subterranean formation comprising a clay, the treatment fluid comprising a plurality of metal oxide nanoparticles dispersed in an aqueous fluid, wherein the metal oxide nanoparticles comprise zinc oxide, manganese oxide, silicon dioxide, or any combination thereof; and interacting the metal oxide nanoparticles with the clay in the subterranean formation to at least partially inhibit entry of the clay into the treatment fluid, wherein the metal oxide nanoparticles have a zeta potential of about 25 mV or greater or about −15 mV or less.

Each of embodiments A and B may have one or more of the following additional Elements in any combination:

Element 1: wherein the metal oxide nanoparticles comprise about 0.01% w/v to about 1% w/v of the treatment fluid by weight of the treatment fluid.

Element 2: wherein the treatment fluid comprises a drilling fluid.

Element 3: wherein the metal oxide nanoparticles comprise: zinc oxide, manganese oxide, silicon dioxide, or any combination thereof.

Element 4: wherein the zinc oxide has a first average particle size of about 90 nm to about 200 nm.

Element 5: wherein the manganese oxide has a second average particle size of about 30 nm to about 60 nm.

Element 6: wherein the silicon dioxide has a third average particle size of about 70 nm to about 90 nm.

Element 7: wherein the plurality of metal oxide nanoparticles are dispersed as a colloidal solution in the aqueous fluid.

Element 8: wherein the treatment fluid is substantially free of alkali metal salts.

Element 9: wherein the treatment fluid is substantially free of potassium chloride.

Element 10: wherein the metal oxide nanoparticles have a zeta potential of about 25 mV or greater or about −15 mV or less.

Element 11: further comprising producing a hydrocarbon from the subterranean formation.

Element 12: wherein the treatment fluid is introduced to the subterranean formation in conjunction with an enhanced oil recovery operation.

Element 13: wherein the zinc oxide, if present, has a first average particle size of about 90 nm to about 200 nm, wherein the manganese oxide, if present, has a second average particle size of about 30 nm to about 60 nm, and wherein the silicon dioxide, if present, has a third average particle size of about 70 nm to about 90 nm.

By way of non-limiting example, exemplary combinations of Elements applicable to A and B include: 1 and 2; 1-3; 1 and 3-4; 1 and 3 and 5; 1 and 3 and 6; 1-3 and 13; 3 and 13; 1 and 7; 2 and 7; 1-7; 1 and 8; 2 and 8; 1-6 and 8; 1-8; 1 and 9; 2 and 9; 1-6 and 9; 1-9; 1 and 11; 2 and 11; 1-6 and 11; 1-9 and 11; 1 and 12; 2 and 12; 1-6 and 12; 1-12; 6-9 and 11-12; 11-13; 1-2 and 11-13; 1-2 and 13; 1 and 2 and 7; 1 and 2 and 7 and 9; 1 and 2 and 7 and 9 and 13.

Further exemplary combinations of Elements applicable to A include: 1 and 10; 2 and 10; 1-6 and 10; 1-10, 1-12.

Further exemplary embodiments may include:

Clause 1. A method comprising: introducing a treatment fluid into a subterranean formation comprising a clay, the treatment fluid comprising a plurality of metal oxide nanoparticles dispersed in an aqueous fluid; and interacting the metal oxide nanoparticles with the clay in the subterranean formation to at least partially inhibit entry of the clay into the treatment fluid.

Clause 2. The method of Clause 1, wherein the metal oxide nanoparticles comprise about 0.01% w/v to about 1% w/v of the treatment fluid by weight of the treatment fluid.

Clause 3. The method of Clause 1 or 2, wherein the treatment fluid comprises a drilling fluid.

Clause 4. The method of any one of Clauses 1-3, wherein the metal oxide nanoparticles comprise: zinc oxide, manganese oxide, silicon dioxide, or any combination thereof.

Clause 5. The method of Clause 4, wherein the zinc oxide has a first average particle size of about 90 nm to about 200 nm.

Clause 6. The method of Clause 4, wherein the manganese oxide has a second average particle size of about 30 nm to about 60 nm.

Clause 7. The method of Clause 4, wherein the silicon dioxide has a third average particle size of about 70 nm to about 90 nm.

Clause 8. The method of any one of Clauses 1-7, wherein the plurality of metal oxide nanoparticles are dispersed as a colloidal solution in the aqueous fluid.

Clause 9. The method of any one of Clauses 1-8, wherein the treatment fluid is substantially free of alkali metal salts.

Clause 10. The method of any one of Clauses 1-9, wherein the treatment fluid is substantially free of potassium chloride.

Clause 11. The method of any one of Clauses 1-10, wherein the metal oxide nanoparticles have a zeta potential of about 25 mV or greater or about −15 mV or less.

Clause 12. The method of any one of Clauses 1-11, further comprising producing a hydrocarbon from the subterranean formation.

Clause 13. The method of any one of Clauses 1-12, wherein the treatment fluid is introduced to the subterranean formation in conjunction with an enhanced oil recovery operation.

Clause 14. A method comprising: introducing a treatment fluid into a subterranean formation comprising a clay, the treatment fluid comprising a plurality of metal oxide nanoparticles dispersed in an aqueous fluid, wherein the metal oxide nanoparticles comprise zinc oxide, manganese oxide, silicon dioxide, or any combination thereof; and interacting the metal oxide nanoparticles with the clay in the subterranean formation to at least partially inhibit entry of the clay into the treatment fluid, wherein the metal oxide nanoparticles have a zeta potential of about 25 mV or greater or about −15 mV or less.

Clause 15. The method of Clause 14, wherein the metal oxide nanoparticles comprise about 0.01% w/v to about 1% w/v of the treatment fluid by weight of the treatment fluid.

Clause 16. The method of Clause 14 or 15, wherein the treatment fluid comprises a drilling fluid.

Clause 17. The method of any one of Clauses 14-16, wherein the zinc oxide, if present, has a first average particle size of about 90 nm to about 200 nm, wherein the manganese oxide, if present, has a second average particle size of about 30 nm to about 60 nm, and wherein the silicon dioxide, if present, has a third average particle size of about 70 nm to about 90 nm.

Clause 18. The method of any one of Clauses 14-17, wherein the plurality of metal oxide nanoparticles are dispersed as a colloidal solution in the aqueous fluid.

Clause 19. The method of any one of Clauses 14-18, wherein the treatment fluid is substantially free of potassium chloride.

Clause 20. The method of any one of Clauses 14-19, further comprising producing a hydrocarbon from the subterranean formation.

To facilitate a better understanding of the embodiments described herein, the following examples of various representative embodiments are given. In no way should the following examples be read to limit, or to define, the scope of the present disclosure.

EXAMPLES

Sample Preparation

Nanoparticles comprising ZnO, MnO, and $SiO_2$ were obtained and combined with drilling fluid including a water-based mud system to form Samples A1-A3. The ZnO particles had an average size of 90 nm to 200 nm. The MnO particles had an average size of 30 nm to 60 nm. The $SiO_2$ particles had an average size of 70 nm to 90 nm. ZnO was used for sample A1, MnO was used for sample A2, and $SiO_2$ was used for sample A3. Each sample A1-A3 was formulated with 0.75 g metal oxide nanoparticles in 350 mL fluid, thus forming a 0.21% w/v (mass nanoparticles (g) per volume fluid (mL)) solution. Fluids used for samples described herein additionally included 1 g XC polymer (a polysaccharide from *Xanthomonas campestris* bacteria) for each 350 mL fluid.

Experiment 1

Rheological properties of samples A1-A3 as well as a comparative example CE-A were measured. Results of testing are shown in Table 1 below.

TABLE 1

Rheological properties test results.

| Sample | A1 | A2 | A3 | CE-A |
|---|---|---|---|---|
| 600 rpm shear (lb/100 ft$^2$) | 16 | 17.2 | 19 | 17.8 |
| 300 rpm shear (lb/100 ft$^2$) | 12 | 13.1 | 14.8 | 13.8 |
| 200 rpm shear (lb/100 ft$^2$) | 10 | 11.5 | 12.8 | 12.2 |

TABLE 1-continued

Rheological properties test results.

| Sample | A1 | A2 | A3 | CE-A |
|---|---|---|---|---|
| 100 rpm shear (lb/100 ft$^2$) | 8 | 9.2 | 10.3 | 9.8 |
| 6 rpm shear (lb/100 ft$^2$) | 3 | 4.1 | 4.7 | 4.6 |
| 3 rpm shear (lb/100 ft$^2$) | 2 | 3.5 | 4 | 3.7 |
| Plastic Viscosity (cP) | 4 | 3.9 | 4.2 | 3.9 |
| Yield Point (lb/100 ft$^2$) | 8 | 9 | 10.6 | 9.9 |
| Gel Strength, 10 sec (lb/100 ft$^2$) | 4 | 4.4 | 4.9 | 4.9 |
| Gel Strength, 10 min (lb/100 ft$^2$) | 5 | 5 | 5.5 | 5.7 |

Experiment 2

Raw metal oxide nanoparticle Samples B1-B3 (comprising ZnO, MnO, and SiO$_2$ metal oxide nanoparticles, respectively) as well as a comparative example of raw Silurian shale Sample CE-B were tested for zeta potential using a ZetaPALS (Brookhaven Instruments). Particles in a testing solution were electrically charged and subjected to an electric field. Velocity measurement toward an electrode was measured to determine zeta potential. Results of zeta potential testing are shown in Table 2 below.

TABLE 2

Zeta potential results.

| Sample | Zeta Potential (mV) |
|---|---|
| B1 | 12.7 |
| B2 | 0.83 |
| B3 | −26.5 |
| CE-B | 5.2 |

Experiment 3

2-4 mm shale cuttings were prepared using Silurian shale core samples. Mud samples C1-C3 and comparative example CE-C were prepared by combining 20 g shale cuttings and 350 mL of drilling fluid samples A1-A3 and CE-A, respectively.

Samples C1-C3 and CE-C along with a comparative were placed in a hot roll cell, and subsequently the hot roll cell was placed in a 65° C. hot roll oven for 16 hours at 35 revolutions per minute (rpm). Subsequently, samples were removed from the hot roll cell and filtered through a 500 micron sieve washing with water. Cuttings retained on the sieve were dried in an oven at 105° C. for 24 hours and subsequently weighed. Results of weights of shale recovery are shown in Table 3 below.

TABLE 3

Shale recovery comparison.

| | C1 | C2 | C3 | CE-C |
|---|---|---|---|---|
| Post-Dispersion Weight (g) | 18.4 | 18.3 | 18.8 | 17.2 |

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A comprising:
    introducing a treatment fluid into a subterranean formation comprising a clay, the treatment fluid comprising a plurality of silicon dioxide nanoparticles and other metal oxide nanoparticles dispersed in an aqueous fluid, wherein the other metal oxide nanoparticles comprise: zinc oxide nanoparticles, manganese oxide nanoparticles, or any combinations thereof; and
    interacting the plurality of silicon dioxide nanoparticles and other metal oxide nanoparticles with the clay in the subterranean formation to at least partially inhibit entry of the clay into the treatment fluids,
    wherein the silicon dioxide nanoparticles have an average particle size of about 70 nm to about 90 nm, wherein the zinc oxide nanoparticles have an average particle size of about 90 nm to about 200 nm, and wherein the manganese oxide nanoparticles have an average particle size of about 30 nm to about 60 nm.

2. The method of claim 1, wherein the plurality of silicon dioxide nanoparticles and other metal oxide nanoparticles comprise about 0.01% w/v to about 1% w/v of the treatment fluid by weight of the treatment fluid.

3. The method of claim 1, wherein the treatment fluid comprises a drilling fluid.

4. The method of claim 1, wherein the plurality of silicon dioxide nanoparticles and other metal oxide nanoparticles are dispersed as a colloidal solution in the aqueous fluid.

5. The method of claim 1, wherein the treatment fluid is free of alkali metal salts.

6. The method of claim 1, wherein the treatment fluid is free of potassium chloride.

7. The method of claim 1, wherein the plurality of silicon dioxide nanoparticles and other metal oxide nanoparticles have a zeta potential of about 25 mV or greater or about −15 mV or less.

8. The method of claim 1, further comprising producing a hydrocarbon from the subterranean formation.

9. The method of claim 1, wherein the treatment fluid is introduced to the subterranean formation in conjunction with an enhanced oil recovery operation.

10. A method comprising:
introducing a treatment fluid into a subterranean formation comprising a clay, the treatment fluid comprising a plurality of silicon dioxide nanoparticles and other metal oxide nanoparticles dispersed in an aqueous fluid, wherein the other metal oxide nanoparticles comprise zinc oxide nanoparticles, manganese oxide nanoparticles, or any combination thereof; and
interacting the plurality of silicon dioxide nanoparticles and other metal oxide nanoparticles with the clay in the subterranean formation to at least partially inhibit entry of the clay into the treatment fluid,
wherein the plurality of silicon dioxide nanoparticles and other metal oxide nanoparticles have a zeta potential of about 25 mV or greater or about −15 m V or less.

11. The method of claim 10, wherein the plurality of silicon dioxide nanoparticles and other metal oxide nanoparticles comprise about 0.01% w/v to about 1% w/v of the treatment fluid by weight of the treatment fluid.

12. The method of claim 10, wherein the treatment fluid comprises a drilling fluid.

13. The method of claim 10, wherein the zinc oxide nanoparticles, have a first average particle size of about 90 nm to about 200 nm, wherein the manganese oxide nanoparticles have a second average particle size of about 30 nm to about 60 nm, and wherein the silicon dioxide nanoparticles have a third average particle size of about 70 nm to about 90 nm.

14. The method of claim 10, wherein the plurality of silicon dioxide nanoparticles and other metal oxide nanoparticles are dispersed as a colloidal solution in the aqueous fluid.

15. The method of claim 10, wherein the treatment fluid is free of potassium chloride.

16. The method of claim 10, further comprising producing a hydrocarbon from the subterranean formation.

* * * * *